US012619484B2

(12) United States Patent
Munagekar et al.

(10) Patent No.: US 12,619,484 B2
(45) Date of Patent: May 5, 2026

(54) SYSTEM AND METHOD OF APPLICATION PROGRAMMING INTERFACE SCHEDULING

(71) Applicant: JIO PLATFORMS LIMITED, Ahmedabad (IN)

(72) Inventors: Ameya Munagekar, Mumbai (IN); Akansha Kumar, Hyderabad (IN); Kamlesh Dhondge, Pune (IN); Akhil Patel Patlolla, Sangareddy (IN); Rajeev Gupta, Mumbai (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 331 days.

(21) Appl. No.: 18/028,474

(22) PCT Filed: Oct. 29, 2022

(86) PCT No.: PCT/IB2022/060434
§ 371 (c)(1),
(2) Date: Mar. 24, 2023

(87) PCT Pub. No.: WO2023/073653
PCT Pub. Date: May 4, 2023

(65) Prior Publication Data
US 2024/0303139 A1     Sep. 12, 2024

(30) Foreign Application Priority Data
Oct. 30, 2021    (IN) ............................ 202121049905

(51) Int. Cl.
G06F 9/54          (2006.01)

(52) U.S. Cl.
CPC .................................. G06F 9/547 (2013.01)

(58) Field of Classification Search
None
See application file for complete search history.

(56)          References Cited

U.S. PATENT DOCUMENTS

| 8,364,513 B2 | 1/2013 | Mitchell et al. |
| 8,527,590 B2 * | 9/2013 | Tapolcai ............. H04L 67/1001 709/205 |
| 2005/0021530 A1 * | 1/2005 | Garg ....................... G06F 9/505 |

(Continued)

FOREIGN PATENT DOCUMENTS

| JP | 2019101541 A | 6/2019 |
| KR | 20140069827 A | 6/2014 |

OTHER PUBLICATIONS

International Search Report, PCT/IB2022/060434, mailed Mar. 2, 2023, Total pp. 02.

*Primary Examiner* — Umut Onat
(74) *Attorney, Agent, or Firm* — Procopio, Cory, Hargreaves & Savitch LLP

(57)          ABSTRACT

The present invention provides a robust and effective solution to an entity or an organization by enabling maximization of the utilization of machine resources by optimally allocating the tasks such as application programming interfaces (APIS) in the queue using a set of predetermined instructions. The method further enables finding the number of machines in order to fulfil a cumulative service-level agreement (SLA) of the APIs in the queue using heuristics and the set of predetermined instructions.

13 Claims, 9 Drawing Sheets

(56)　　　　　　　References Cited

U.S. PATENT DOCUMENTS

| | | | |
|---|---|---|---|
| 2015/0263906 A1* | 9/2015 | Kasturi | .................. H04L 67/61 |
| | | | 709/224 |
| 2017/0161102 A1 | 6/2017 | Rangaraju et al. | |
| 2019/0149424 A1 | 5/2019 | O'Neill et al. | |
| 2019/0213538 A1 | 7/2019 | Bebout et al. | |
| 2020/0177671 A1* | 6/2020 | Tofighbakhsh | ......... H04L 67/12 |
| 2022/0141685 A1* | 5/2022 | Ergen | ................. H04W 28/084 |
| | | | 370/252 |

* cited by examiner

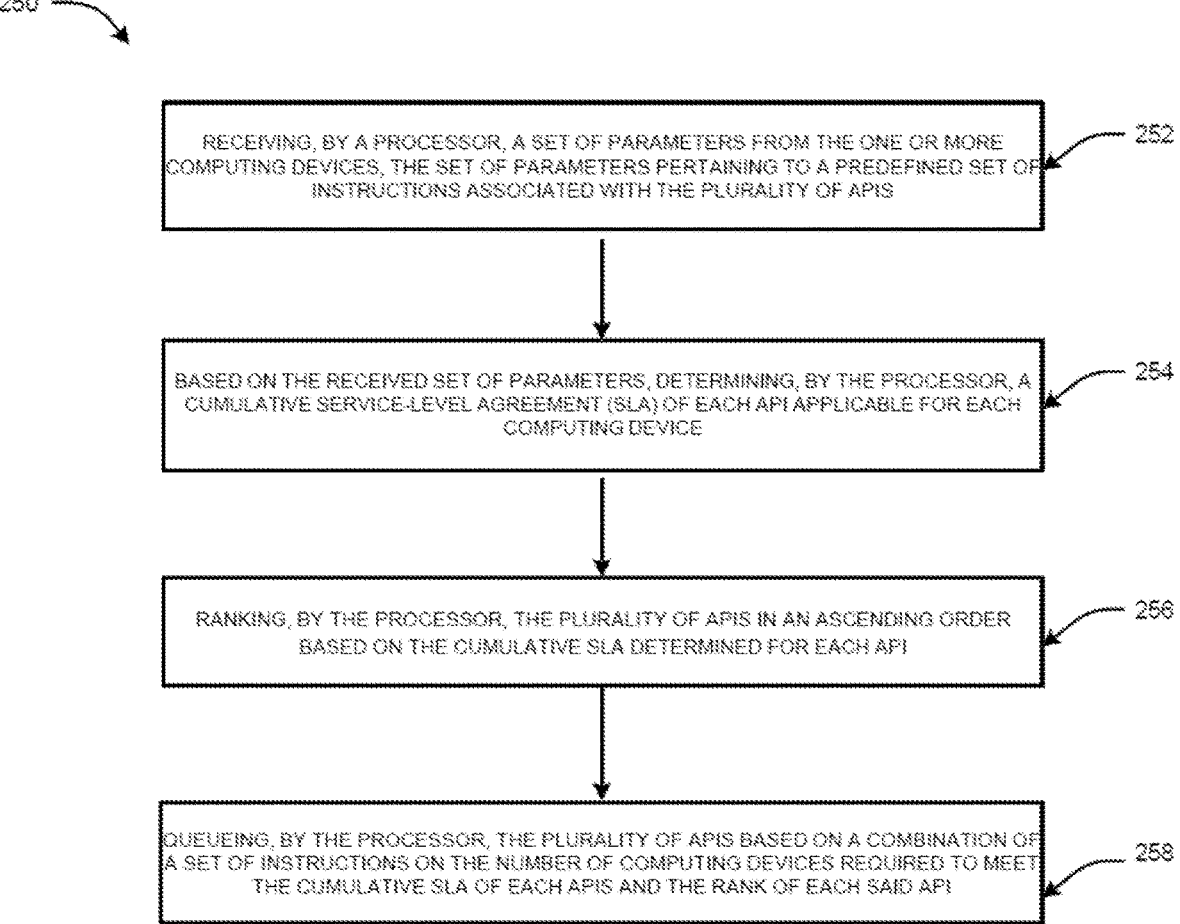

250

RECEIVING, BY A PROCESSOR, A SET OF PARAMETERS FROM THE ONE OR MORE
COMPUTING DEVICES, THE SET OF PARAMETERS PERTAINING TO A PREDEFINED SET OF
INSTRUCTIONS ASSOCIATED WITH THE PLURALITY OF APIS
— 252

BASED ON THE RECEIVED SET OF PARAMETERS, DETERMINING, BY THE PROCESSOR, A
CUMULATIVE SERVICE-LEVEL AGREEMENT (SLA) OF EACH API APPLICABLE FOR EACH
COMPUTING DEVICE
— 254

RANKING, BY THE PROCESSOR, THE PLURALITY OF APIS IN AN ASCENDING ORDER
BASED ON THE CUMULATIVE SLA DETERMINED FOR EACH API
— 256

QUEUEING, BY THE PROCESSOR, THE PLURALITY OF APIS BASED ON A COMBINATION OF
A SET OF INSTRUCTIONS ON THE NUMBER OF COMPUTING DEVICES REQUIRED TO MEET
THE CUMULATIVE SLA OF EACH APIS AND THE RANK OF EACH SAID API
— 258

SET OF APIS IN THE
QUEUE
402

INPUT:
1. API PARAMETERS
2. AVAILABLE MACHINE TYPES
3. CONSTRAINT
PARAMETERS
404

API OPTIMIZATION BRAIN
406

OUTPUT:
API TO MACHINE
ALLOCATION AND
QUEUEING
408

OUTPUT:
NUMBER OF MACHINES
REQUIRED TO MEET THE
CUMULATIVE SLA
410

440

| Set Of APIs In The Queue 442 | → | Creating Bins On machines Of The APIs 444 | → | Sequencing The Bins to Get The Start Times 446 |

450

| Input : set Of APIs In The Queue 442 | → | Mip Model To Create bins In The Available Machines 452 | → | Output : APIs Clubbed In Bins 454 |

SYSTEM AND METHOD OF APPLICATION PROGRAMMING INTERFACE SCHEDULING

FIELD OF INVENTION

The embodiments of the present disclosure herein relate to scheduling assignment problem of one or more Application Programming Interface (API) on one or more available machines in an API management system.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Application Programming Interfaces (APIs) are communication mechanism between different services. An API lifecycle is usually driven by an API provider (who may be responding to consumer requests). APIs may exist in various versions and software lifecycle states within a system landscape and are frequently developed like any software by API developers (including those of API consumers) using an integrated development environment (IDE). After a successful test within an IDE, a particular API is usually deployed in a test/quality landscape for further tests (e.g., integration tests). After further successful tests, the API is deployed in a productive landscape. These states (e.g., development version, test/quality version, and productive version) are typically managed by the API provider. Services hold the business logic for a task. These APIs are exposed for a consumer for usage over a network with many different interfaces or custom home-made interfaces. As the services grow, the number of APIs increase in size and it becomes difficult to manage all remote APIs at a single place for an organization.

Problems occur when APIs grow within an enterprise and there is a huge number of inconsistent APIs when there is a need of reinventing common modules, locating and consuming multiple API from different teams, onboarding new APIs as per end user's requirements, using a chain of APIs for a particular task and the like. Contemporary optimization methods cannot maximize the machine utilization for a service-level agreement (SLA) in perspective. Additionally, minimum number of machines required to schedule the set of APIs to adhere to the cumulative SLA is difficult to determine.

There is therefore a need in the art to provide a method and a system that can overcome the shortcomings of the existing prior art.

OBJECTS OF THE PRESENT DISCLOSURE

Some of the objects of the present disclosure, which at least one embodiment herein satisfies are as listed herein below.

An object of the present disclosure is to provide for a method and system to maximize the utilization of the available machine resources.

An object of the present disclosure is to provide for a method and system for finding the number of machines in order to fulfil the cumulative SLA of the APIs in the queue.

An object of the present disclosure is to provide for a method and system for minimizing the resources used i.e., machines in order to meet the cumulative SLA of the APIs to be scheduled.

SUMMARY

This section is provided to introduce certain objects and aspects of the present invention in a simplified form that are further described below in the detailed description. This summary is not intended to identify the key features or the scope of the claimed subject matter.

In an aspect, the present disclosure provides a system for facilitating scheduling of a plurality of application programming interfaces (API), the system may include a processor coupled to one or more computing devices in a network. The processor may be further coupled with a memory that stores instructions which when executed by the processor may cause the system to: receive a set of parameters from the one or more computing devices, the set of parameters pertaining to a predefined set of instructions associated with the plurality of APIs. Based on the received set of parameters, determine a cumulative service-level agreement (SLA) of each API applicable for each computing device. The system may then be configured to rank, the plurality of APIs in an ascending order based on the cumulative SLA determined for each API and then queue, the plurality of APIs based on a combination of a set of instructions on the number of computing devices required to meet the cumulative SLA of each APIs and the rank of each API.

In an embodiment, the system may be further configured to assign one or more APIs to be executed on the computing device from the available set of computing devices based on the queued plurality of APIs.

In an embodiment, the set of parameters may include any or a combination of processing engines, memory and graphical processing units (GPU) utilization of the plurality of APIs in the queue, the available set of computing devices in the queue and the constraint parameters such as the cumulative SLA of each said API in the queue.

In an embodiment, the set of instructions may provide optimization of scheduling of the plurality of APIs In an embodiment, the set of instructions further may provide at least two simultaneous outputs such as the number of computing devices required for running the plurality of APIs and allocation of the APIs to the computing devices.

In an embodiment, the system is further configured to find a minimum number of computing devices required to schedule the plurality of API to adhere to the cumulative SLA.

In an embodiment, to find the minimum number of computing devices the system may be further configured to use a mixed integer programming module (MIP) model for allocating the APIs in the queue and provide an iterative increment to check whether the set of computing devices manage to meet the cumulative SLA.

In an embodiment, the system may be further configured to create a plurality of bins of the plurality of APIs on the available set of computing devices such that the utilization efficiency of the available set of computing devices is maximized.

In an embodiment, the system may be further configured to club the plurality of APIs in a bin and the computing device to which the bin should be assigned.

In an aspect, the present disclosure provides a user equipment (UE) for facilitating scheduling of a plurality of application programming interfaces (API), the UE may include a processor and a receiver, the processor being coupled to one or more computing devices in a network. The processor may be further coupled with a memory that stores instructions which when executed by the processor may cause the UE to: receive a set of parameters from the one or more computing devices, the set of parameters pertaining to a predefined set of instructions associated with the plurality of APIs. Based on the received set of parameters, determine a cumulative service-level agreement (SLA) of each API applicable for each computing device. The UE may then be configured to rank, the plurality of APIs in an ascending order based on the cumulative SLA determined for each API and then queue, the plurality of APIs based on a combination of a set of instructions on the number of computing devices required to meet the cumulative SLA of each APIs and the rank of each API.

In an aspect, the present disclosure provides a method for facilitating scheduling of a plurality of application programming interfaces (API). The method may include the step of receiving, by a processor, a set of parameters from the one or more computing devices, the set of parameters pertaining to a predefined set of instructions associated with the plurality of APIs. In an embodiment, the processor may be coupled to the one or more computing devices in a network, the processor may be further coupled with a memory that stores instructions that are executed by the processor. Based on the received set of parameters, the method may further include the step of determining, by the processor, a cumulative service-level agreement (SLA) of each API applicable for each computing device and then the step of ranking, by the processor, the plurality of APIs in an ascending order based on the cumulative SLA determined for each API. Furthermore, the method may include the step of queueing, by the processor, the plurality of APIs based on a combination of a set of instructions on the number of computing devices required to meet the cumulative SLA of each APIs and the rank of each API.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

FIG. 2C illustrates an exemplary representation of the proposed method (250) for optimizing and scheduling APIs, in accordance with an embodiment of the present disclosure.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

The present invention provides a robust and effective solution to an entity or an organization by enabling maximization of the utilization of machine resources by optimally allocating the tasks such as application programming interfaces (APIS) in the queue using a set of predetermined instructions. The method further enables finding the number of machines in order to fulfil a cumulative service-level agreement (SLA) of the APIs in the queue using heuristics and the set of predetermined instructions.

Figure 1:
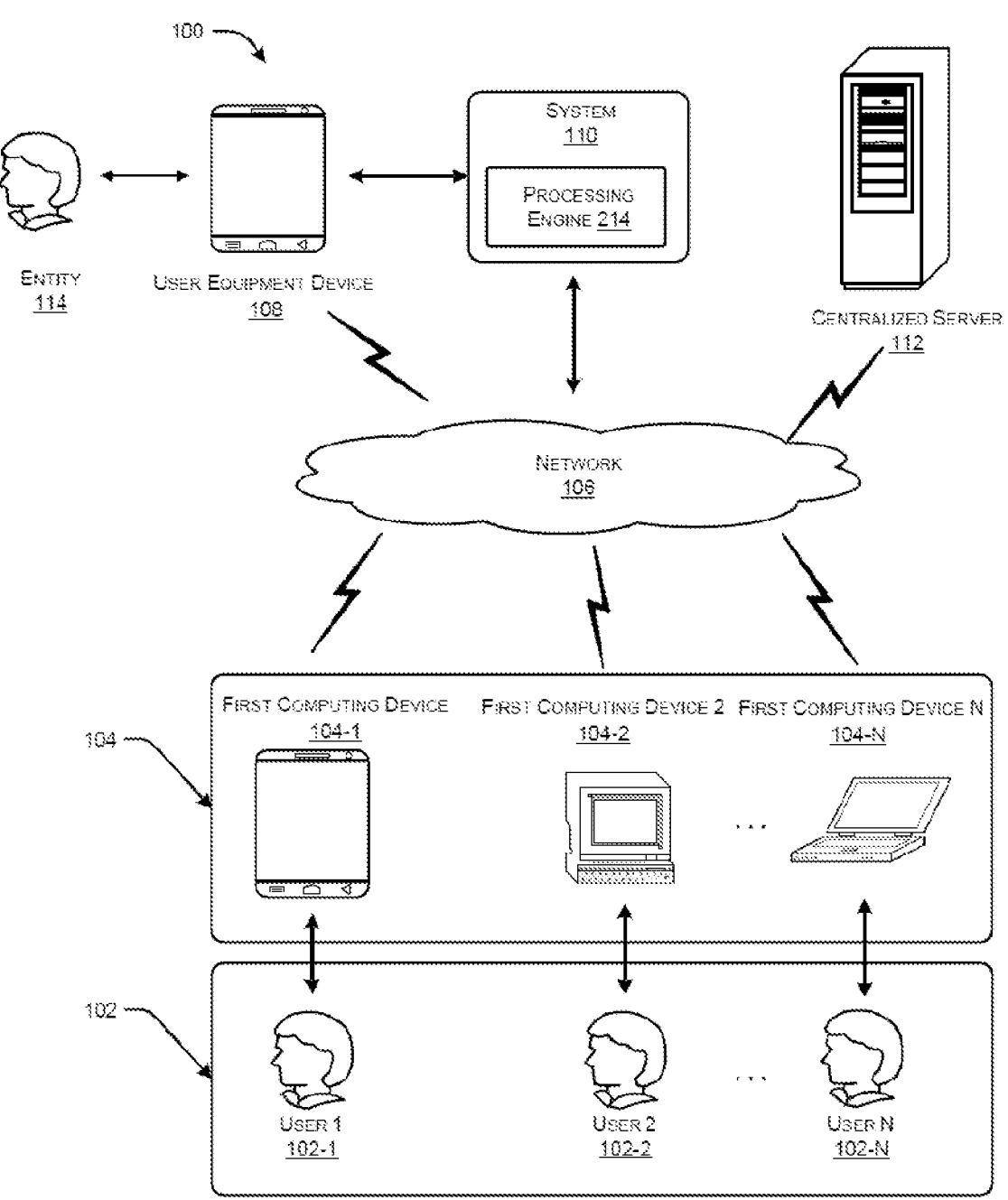
FIG. 1 that illustrates an exemplary network architecture in which or with which the proposed system of the present disclosure can be implemented, in accordance with an embodiment of the present disclosure.

Referring to FIG. 1 that illustrates an exemplary network architecture (100) in which or with which API management system (110) (interchangeably referred of the present disclosure can be implemented, in accordance with an embodiment of the present disclosure. As illustrated, the exemplary architecture (100) includes one or more communicably coupled computing devices (104-1, 104-2, . . . 104-N) (also referred to as machines herein) that communicate across a network (106) (note that although only network 106 connections have been labelled in FIG. 1, one or more of the other indicated connections between components can also be considered part of network 106).

In some implementations, the system (110) or portions of the system (110) can operate within a cloud-computing-based environment associated with a centralized server (112). As an example, and not by way of limitation, the user computing device (104) may be operatively coupled to the centralized server (112) through the network (106) and may be associated with the entity (114). Examples of the user computing devices (104) can include, but are not limited to a smart phone, a portable computer, a personal digital assistant, a handheld phone and the like.

The system (110) may further be operatively coupled to a second computing device (108) (also referred to as the user computing device or user equipment (UE) hereinafter) associated with the entity (114). The entity (114) may include a company, a hospital, an organisation, a university, a lab facility, a business enterprise, or any other secured facility that may require features associated with a plurality of API. In some implementations, the system (110) may also be associated with the UE (108). The UE (108) can include a handheld device, a smart phone, a laptop, a palm top and the like. Further, the system (110) may also be communicatively coupled to the one or more first computing devices (104) via a communication network (106).

In an aspect, the system (110) may receive a set of parameters from the one or more computing devices (104), the set of parameters pertaining to a predefined set of instructions associated with the plurality of APIs. Based on the received set of parameters, determine a cumulative service-level agreement (SLA) of each API applicable for each computing device (104). The system (110) may rank, the plurality of APIs in an ascending order based on the cumulative SLA determined for each API and then queue, the plurality of APIs based on a combination of a set of instructions on the number of computing devices required to meet the cumulative SLA of each APIs and the rank of each API.

In an embodiment, the system may be further configured to assign one or more APIs to be executed on the computing device (104) from the available set of computing devices based on the queued plurality of APIs.

In an exemplary embodiment, the set of parameters may include central processing unit (CPU), random access memory (RAM) and graphical processing unit (GPU) utilization of the APIs in the queue, the available machines in the queue and the constraint parameters such as the cumulative SLA of the APIs in the queue.

In an exemplary embodiment, the set of instructions may be an optimization method that may provide at least two simultaneous outputs such as the number of machines required for running all the APIs and the comply the cumulative SLA and the allocation of the APIs to the machines.

In an embodiment, the one or more computing devices (104) may communicate with the system (110) via set of executable instructions residing on any operating system, including but not limited to, Android™. IOS™, Kai OS™ and the like. In an embodiment, to one or more computing devices (104), may include, but not limited to, any electrical, electronic, electro-mechanical or an equipment or a combination of one or more of the above devices such as mobile phone, smartphone, virtual reality (VR) devices, augmented reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen, receiving devices for receiving any audio or visual signal in any range of frequencies and transmitting devices that can transmit any audio or visual signal in any range of frequencies. It may be appreciated that the to one or more computing devices (104) may not be restricted to the mentioned devices and various other devices may be used. A smart computing device may be one of the appropriate systems for storing data and other private/sensitive information.

In an embodiment, the system (110) may include a processor coupled with a memory, wherein the memory may store instructions which when executed by the one or more processors may cause the system to access content stored in a network.

Figure 2A:
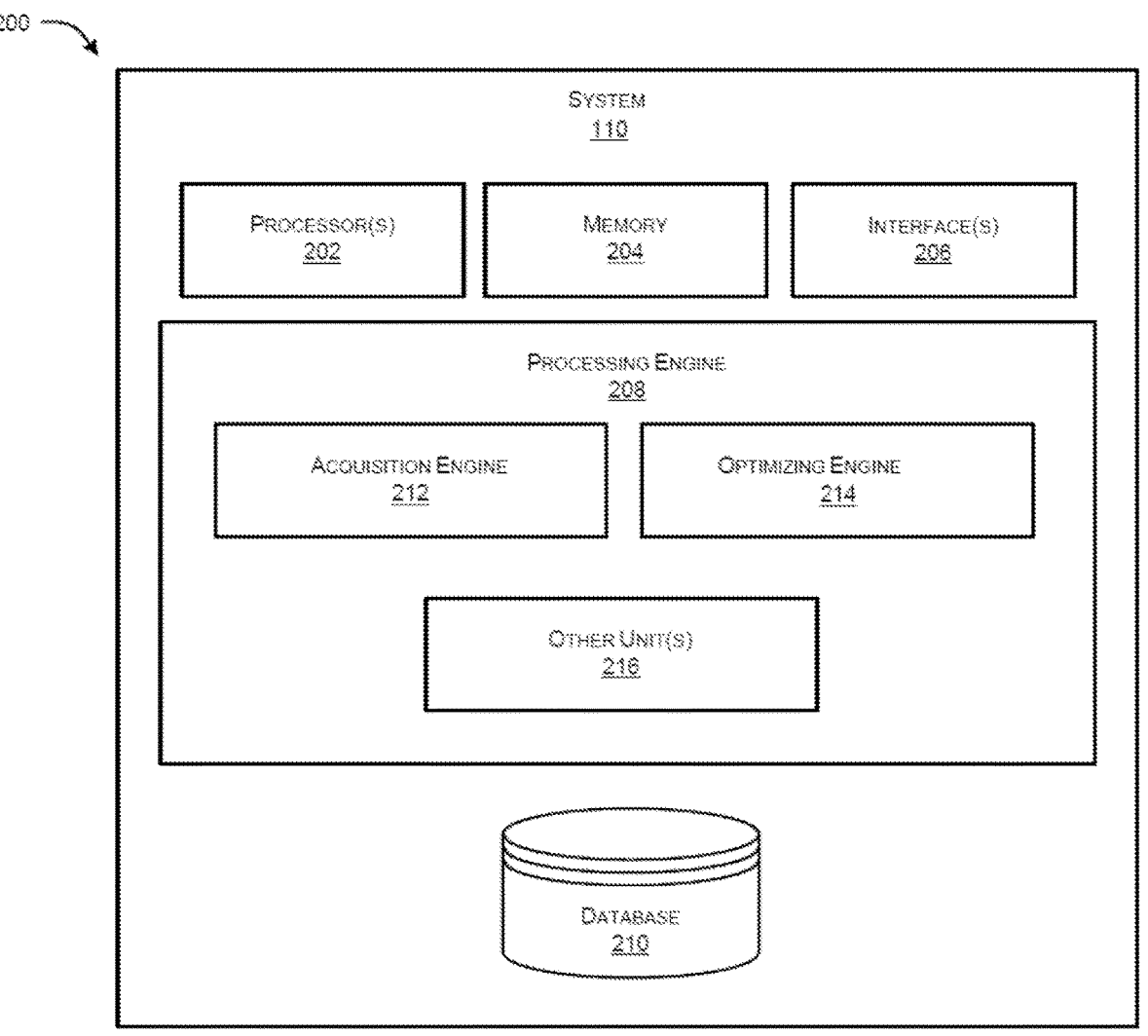
FIG. 2A illustrates an exemplary representation of the system (110) for optimizing and scheduling APIs, in accordance with an embodiment of the present disclosure.

FIG. 2A with reference to FIG. 1, illustrates an exemplary representation of system (110) for facilitating scheduling of APIs, in accordance with an embodiment of the present disclosure. In an aspect, the system (110) may comprise one or more processor(s) (202). The one or more processor(s) (202) may be implemented as one or more microprocessors, microcomputers, microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the system (110). The memory (204) may be configured to store one or more computer-readable instructions or routines in a non-transitory computer readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the system (110) may include an interface(s) 206. The interface(s) 206 may comprise a variety of interfaces, for example, interfaces for data input and output devices, referred to as I/O devices, storage devices, and the like. The interface(s) 206 may facilitate communication of the system (110). The interface(s) 204 may also provide a communication pathway for one or more components of the system (110). Examples of such components include, but are not limited to, processing engine(s) 208 and a database 210.

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the system (110) may comprise the machine-readable storage medium storing the instructions and the processing resource to execute the instructions, or the machine-readable storage medium may be separate but accessible to the system (110) and the processing resource. In other examples, the processing engine(s) (208) may be implemented by electronic circuitry.

The processing engine (208) may include one or more engines selected from any of an acquisition engine (212), an optimizing engine (214), and other engines (216). The processing engine (208) may further include a mixed integer programming (MIP) module and heuristics based on a neural network algorithm.

Figure 2B:
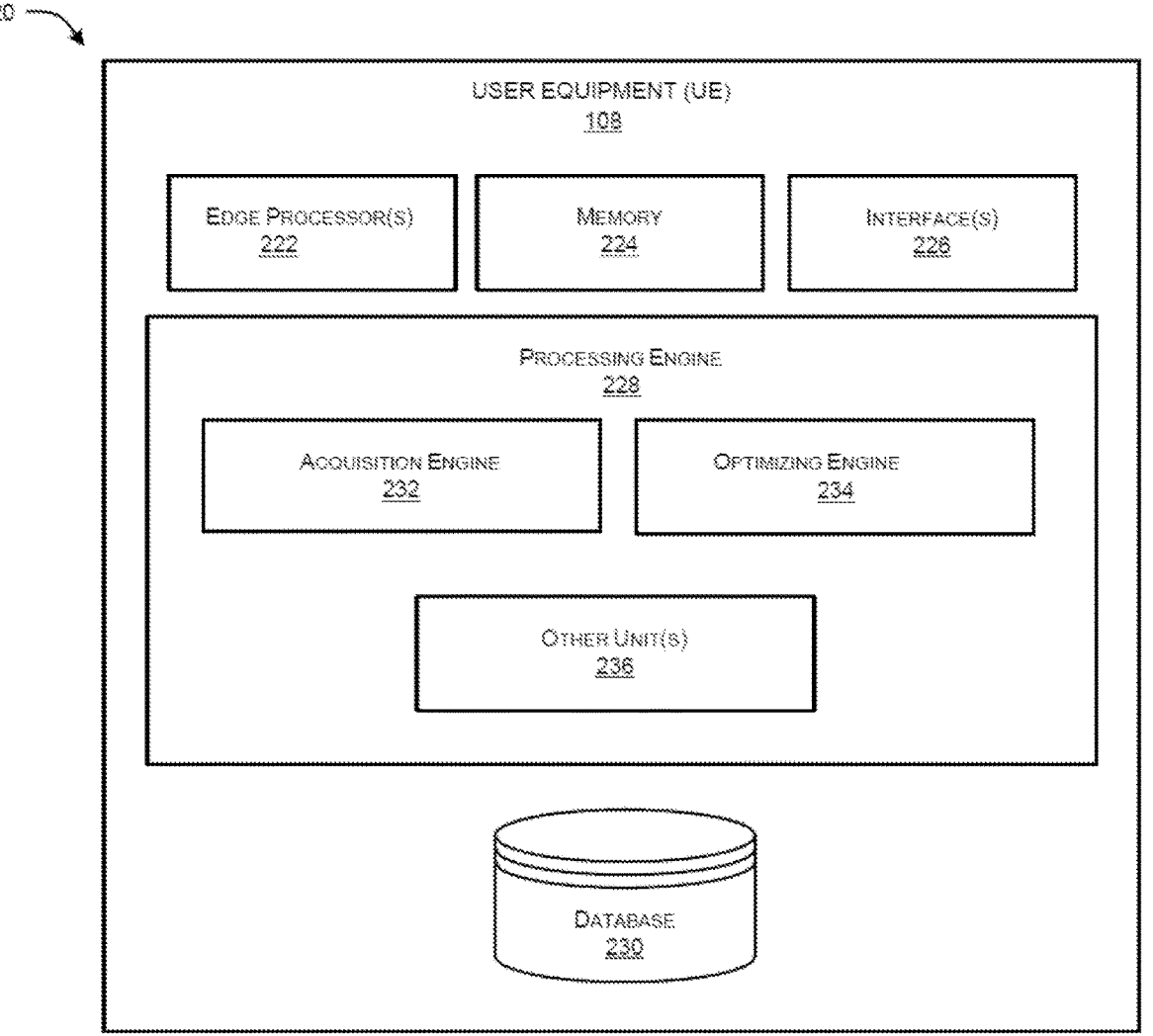
FIG. 2B illustrates an exemplary representation of the user equipment (UE) (108) for forecasting execution time of APIs, in accordance with an embodiment of the present disclosure.

FIG. 2B illustrates an exemplary representation (220) of the user equipment (UE) (108), in accordance with an embodiment of the present disclosure. In an aspect, the UE (108) may comprise an edge processor (222). The edge processor (222) may be implemented as one or more micro-processors, microcomputers, microcontrollers, digital signal processors, central processing units, logic circuitries, and/or any devices that process data based on operational instructions. Among other capabilities, the edge processor(s) (222) may be configured to fetch and execute computer-readable instructions stored in a memory (224) of the UE (108). The memory (224) may be configured to store one or more computer-readable instructions or routines in a non-transitory computer readable storage medium, which may be fetched and executed to create or share data packets over a network service. The memory (224) may comprise any non-transitory storage device including, for example, volatile memory such as RAM, or non-volatile memory such as EPROM, flash memory, and the like.

In an embodiment, the UE (108) may include an interface(s) 226. The interface(s) 206 may comprise a variety of interfaces, for example, interfaces for data input and output devices, referred to as DO devices, storage devices, and the like. The interface(s) 206 may facilitate communication of the UE (108). Examples of such components include, but are not limited to, processing engine(s) 228 and a database (230).

The processing engine(s) (228) may be implemented as a combination of hardware and programming (for example, programmable instructions) to implement one or more functionalities of the processing engine(s) (228). In examples described herein, such combinations of hardware and programming may be implemented in several different ways. For example, the programming for the processing engine(s) (228) may be processor executable instructions stored on a non-transitory machine-readable storage medium and the hardware for the processing engine(s) (228) may comprise a processing resource (for example, one or more processors), to execute such instructions. In the present examples, the machine-readable storage medium may store instructions that, when executed by the processing resource, implement the processing engine(s) (228). In such examples, the UE (108) may comprise the machine-readable storage medium storing the instructions and the processing resource to execute the instructions, or the machine-readable storage medium may be separate but accessible to the UE (108) and the processing resource. In other examples, the processing engine(s) (228) may be implemented by electronic circuitry.

The processing engine (228) may include one or more engines selected from any of a data acquisition engine (232), an optimizing engine (234), and other engines (236).

FIG. 2C illustrates an exemplary representation of the proposed method (250) for optimizing and scheduling APIs, in accordance with an embodiment of the present disclosure. The method (250) may include at 252, the step of receiving, by the processor (202), a set of parameters from the one or more computing devices, the set of parameters pertaining to a predefined set of instructions associated with the plurality of APIs. Based on the received set of parameters, the method (250) may further include at 254, the step of determining, by the processor, a cumulative service-level agreement (SLA) of each API applicable for each computing device.

Further, the method (250) may include at 256, the step of ranking, by the processor, the plurality of APIs in an ascending order based on the cumulative SLA determined for each API. Furthermore, the method may include at 2568, the step of queueing, by the processor, the plurality of APIs based on a combination of a set of instructions on the number of computing devices required to meet the cumulative SLA of each APIs and the rank of each API.

Figure 3:
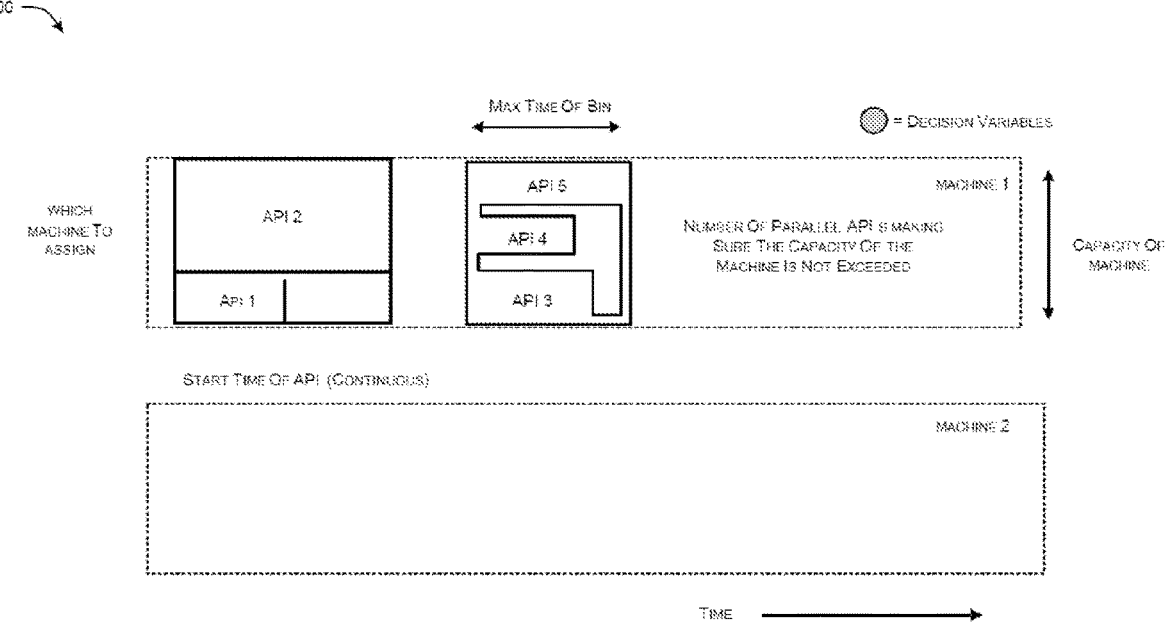
FIG. 3 illustrates an exemplary representation of allocation of APIs to the machines, in accordance with an embodiment of the present disclosure.

FIG. 3 illustrates an exemplary representation of allocation of APIs to the machines, in accordance with an embodiment of the present disclosure. As illustrated, the main aspect of the assignment and scheduling model of the APIs is to create bins of APIs on the available machines such that the utilization efficiency of the machines are maximized. The objective is to schedule the APIs on a given number machines such that the total time of completion of all the APIs is minimized and to find the minimum number of machines such that the time constraint i.e., the total time of completion of all the APIs is satisfied. As shown in FIG. 3, the width of the box is the capacity of the machine at any given instance; the length of the box is the time on the machine. The different shaded bins are the once to be determined such that the white space (capacity and time) in the bin is minimized.

Exemplary Scenarios

FIGS. 4A-4D illustrate exemplary representations of a high-level method flow diagram of optimization method, in accordance with an embodiment of the present disclosure. As illustrated, in FIG. 4A, the method at 402, the API queue consist of the API waiting to be executed on the machines and at 404, the input consist of the API parameters such as the CPU, RAM and GPU utilization of the APIs in the queue, the available machines in the queue and the constraint parameters such as the cumulative SLA of the APIs in the queue. At 406, the API Optimization brain consists of the MIP model and the heuristics and then the Optimization brain provides two simultaneous outputs at 408, the number of machines required for running all the APIs and the comply the cumulative SLA and at 410, the allocation of the APIs to the machines.

Figure 4A:
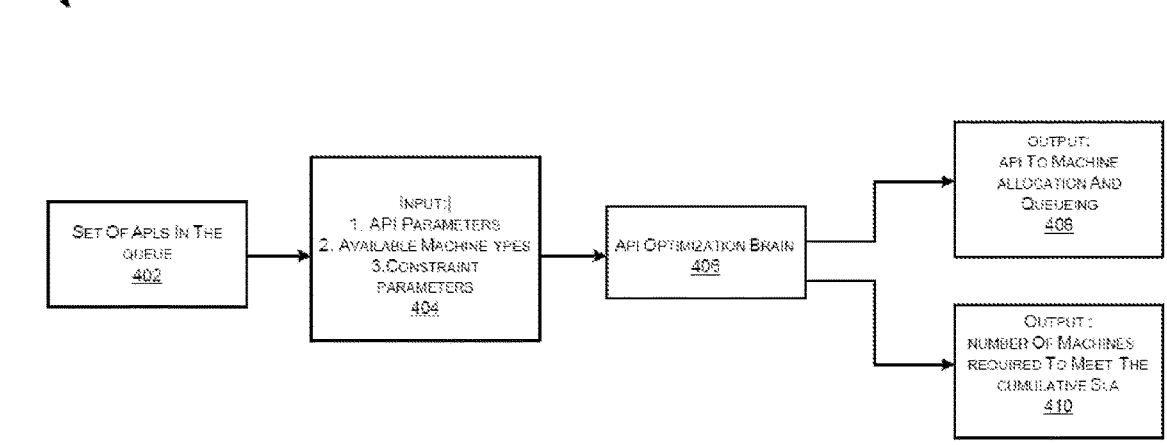
FIGS. 4A-4D illustrate exemplary representations of a high level method flow diagram of optimization method, in accordance with an embodiment of the present disclosure.
Figure 4B:
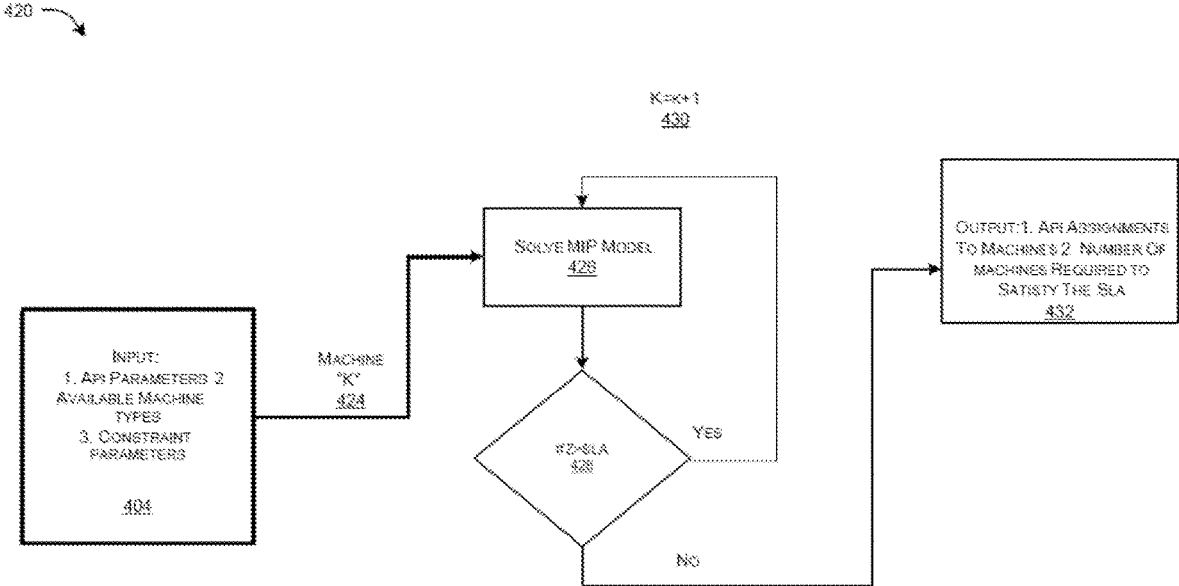

In FIG. 4B, number of machines heuristic is shown. As shown in the FIG. 4B, the Heuristic to find the number of machines to run the APIs to meet the cumulative SLA works in two parts. Firstly, the MIP model (426) for allocating the APIs in the queue, Secondly, the iterative increment to check whether the set of machines "k" (424) manages to meet the SLA. The parameters considered for the APIs are the RAM, CPU and GPU utilization percentages (404).

Figure 4C:
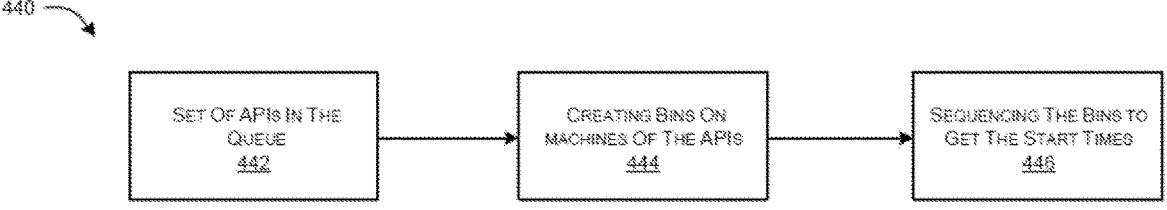

With reference to FIG. 3, FIG. 4C illustrates assignment and scheduling of APIs. The main aspect of the Assignment and scheduling model of the APIs is to create bins of APIs on the available machines such that the utilization efficiency of the machines may be maximized.

Figure 4D:
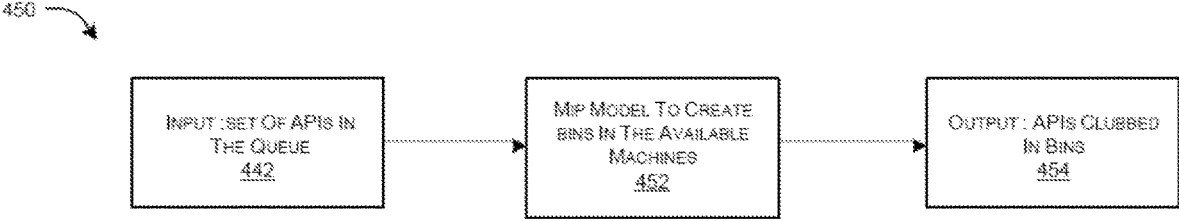
Figure 5:
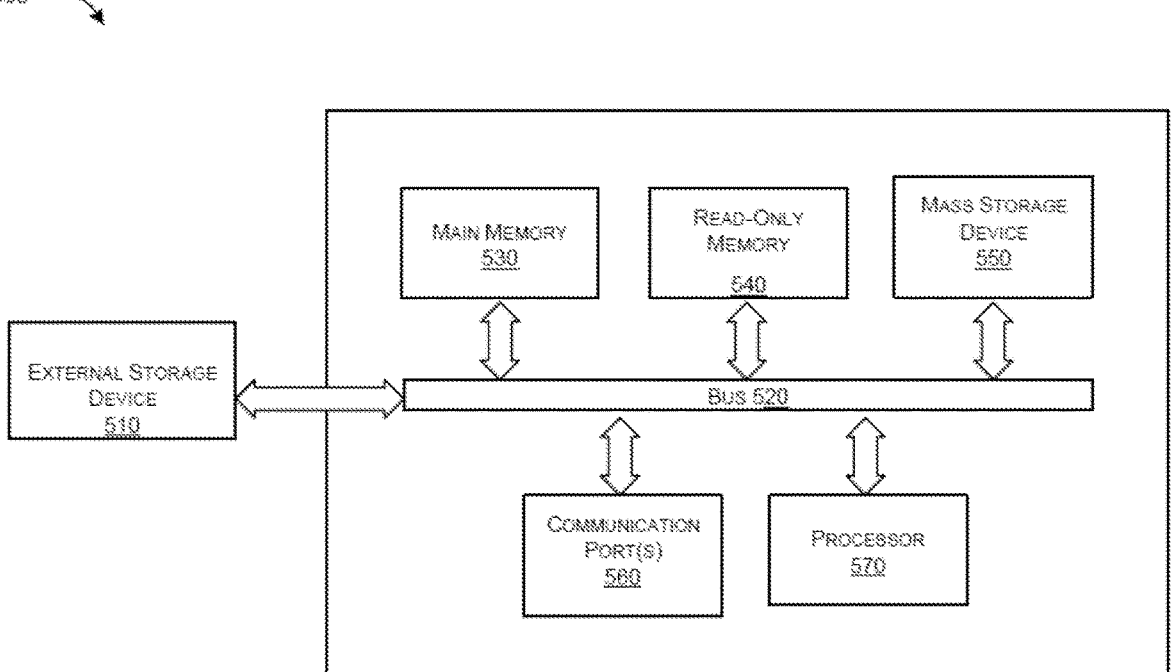
FIG. 5 illustrates an exemplary computer system in which or with which embodiments of the present invention can be utilized in accordance with embodiments of the present disclosure.

FIG. 4D illustrates an exemplary embodiment, the MIP bin packing model flow. The MIP model considers the set of available APIs as input at 442 and then at 452 the bins may be created to be allocated to the machines as output; as shown in the FIG. 4D. Once the bins are received from the optimization model, they can be arranged in any order as the cumulative SLA would be satisfied in the first place and would have been considered in the MIP model at 454. The MIP Model may include the following parameters:

Decision Variables:

$X_{i,j} = \{0,1\}$ Binary Variable used to map if job j in bin i $Y_i = \{0,1\}$ Binary Variable used to map if bin i is used $t_i$ = Integer variable used to map the max time in bin i $S_k$ = Integer variable used to map the max time in machine k M = Integer variable used to map the max time on machine Parameters:

$T_{i,j}$ = Time of running job i on bin j $G_{i,j}$ = CPU utilization of running job i on bin j $G_{i,j}$ = GPU utilization of running job i on bin j $R_{i,j}$ = RAM utilization of running job i on bin j $MC_j$ = Maximum CPU available on bin j $MG_j$=Maximum GPU available on bin j
$MR_j$=Maximum RAM available on bin j
Objective Function:
   Minimize M
Constraints:
1. Bin Capacity Constraint:
   $\Sigma_j C_{i,j}*X_{i,j} \leq MG_j$ ∀i in bins
   $\Sigma_j G_{i,j}*X_{i,j} \leq MG_j$ ∀i in bins
   $\Sigma_j R_{i,j}*X_{i,j} \leq MR_j$ ∀i in bins
2. A job can be assigned to only one bin
   $\Sigma_i X_{i,j}==1$ ∀j in jobs
3. Max time in bin
   $t_i \geq T_{i,j}*X_{i,j}$ ∀i in bins, j in jobs
4. Max time in machines
   $S_k \geq \Sigma_{i \in k} t_i$ ∀k in machines
5. Cumulative Max time used to minimize the max time
   $M \geq S_k$ ∀k in machines FIG. 5 illustrates an exemplary computer system in which or with which embodiments of the present invention can be utilized in accordance with embodiments of the present disclosure. As shown in FIG. 5, computer system 500 can include an external storage device 510, a bus 520, a main memory 530, a read only memory 540, a mass storage device 550, communication port 560, and a processor 570. A person skilled in the art will appreciate that the computer system may include more than one processor and communication ports. Processor 550 may include various modules associated with embodiments of the present invention. Communication port 560 may be chosen depending on a network, or any network to which computer system connects. Memory 530 can be Random Access Memory (RAM), or any other dynamic storage device commonly known in the art. Read-only memory 540 can be any static storage device (s). Mass storage 550 may be any current or future mass storage solution, which can be used to store information and/or instructions.

Bus 520 communicatively couples processor(s) 570 with the other memory, storage and communication blocks.

Optionally, operator and administrative interfaces, e.g. a display, keyboard, and a cursor control device, may also be coupled to bus 520 to support direct operator interaction with a computer system. Other operator and administrative interfaces can be provided through network connections connected through communication port 560. Components described above are meant only to exemplify various possibilities. In no way should the aforementioned exemplary computer system limit the scope of the present disclosure.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

Advantages of the Present Disclosure

The present disclosure provides for a system and method to maximize the utilization of the available machine resources.

The present disclosure provides for a method and system for finding the number of machines in order to fulfil the cumulative SLA of the APIs in the queue.

The present disclosure provides for a method and system for minimizing the resources used i.e. machines in order to meet the cumulative SLA of the APIs to be scheduled.

We claim:
1. A system for facilitating scheduling of a plurality of application programming interfaces (APIs), the system comprising:
   a processor coupled to one or more computing devices in a network, and a memory, wherein the processor is further coupled with the memory, and wherein said memory stores instructions which when executed by the processor causes the system to:
   receive a set of parameters from the one or more computing devices, the set of parameters pertaining to a predefined set of instructions associated with the plurality of APIs;
   based on the received set of parameters, determine a cumulative service-level agreement (SLA) of each API applicable for each computing device;
   rank, the plurality of APIs in an ascending order based on the cumulative SLA determined for each API;
   queue, the plurality of APIs based on a combination of a set of instructions on a number of computing devices required to meet the cumulative SLA of each API and the rank of each said API;
   find a minimum number of computing devices required to schedule the plurality of APIs to adhere to the cumulative SLA, wherein finding the minimum number of computing devices comprises:
   using a mixed integer programming (MIP) model for allocating the plurality of APIs in the queue;
   providing an iterative increment to check whether a current set of computing devices manages to meet the cumulative SLA;
   assign the plurality of APIs to the minimum number of computing devices based on an allocation determined by the MIP model, the assigning being by creating bins of the plurality of APIs on the minimum number of computing devices; and
   execute the plurality of APIs on the minimum number of computing devices according to the allocation.
2. The system as claimed in claim 1, wherein the memory stores further instructions which, when executed by the processor, cause the system to assign one or more APIs to be executed on the one or more computing devices from available set of computing devices based on the queued plurality of APIs.
3. The system as claimed in claim 1, wherein the set of parameters includes any or a combination of processing engines, memory and graphical processing units (GPU) utilization of the plurality of APIs in the queue, available set of computing devices in the queue and constraint parameters comprising the cumulative SLA of each said API in the queue.

4. The system as claimed in claim 1, wherein the set of instructions provides optimization of scheduling of the plurality of APIs.

5. The system as claimed in claim 4, wherein the set of instructions further provides at least two simultaneous outputs comprising the number of computing devices required for running the plurality of APIs and allocation of the APIs to the computing devices.

6. The system as claimed in claim 1, wherein the memory stores further instructions which, when executed by the processor, cause the system to club the plurality of APIs in a bin and the one or more computing devices to which the bin should be assigned.

7. A user equipment (UE) for facilitating scheduling of a plurality of application programming interfaces (APIs), the UE comprising:

an edge processor, a receiver coupled to one or more computing devices in a network, and a memory, wherein the edge processor is further coupled with the memory, and wherein said memory stores instructions which when executed by the edge processor causes the UE to:

receive a set of parameters from the one or more computing devices, the set of parameters pertaining to a predefined set of instructions associated with the plurality of APIs;

based on the received set of parameters, determine a cumulative service-level agreement (SLA) of each API applicable for each computing device;

rank, the plurality of APIs in an ascending order based on the cumulative SLA determined for each API;

queue, the plurality of APIs based on a combination of a set of instructions on a number of computing devices required to meet the cumulative SLA of each API and the rank of each said API;

find a minimum number of computing devices required to schedule the plurality of APIs to adhere to the cumulative SLA, wherein finding the minimum number of computing devices comprises:

using a mixed integer programming (MIP) model for allocating the plurality of APIs in the queue;

providing an iterative increment to check whether a current set of computing devices manages to meet the cumulative SLA;

assign the plurality of APIs to the minimum number of computing devices based on an allocation determined by the MIP model, the assigning being by creating bins of the plurality of APIs on the minimum number of computing devices; and execute the plurality of APIs on the minimum number of computing devices according to the allocation.

8. A method for facilitating scheduling of a plurality of application programming interfaces (APIs), the method comprising:

receiving, by a processor, a set of parameters from one or more computing devices, the set of parameters pertaining to a predefined set of instructions associated with the plurality of APIs, wherein the processor is coupled to the one or more computing devices in a network, wherein the processor is further coupled with a memory that stores instructions that are executed by the processor;

based on the received set of parameters, determining, by the processor, a cumulative service-level agreement (SLA) of each API applicable for each computing device;

ranking, by the processor, the plurality of APIs in an ascending order based on the cumulative SLA determined for each API;

queueing, by the processor, the plurality of APIs based on a combination of a set of instructions on a number of computing devices required to meet the cumulative SLA of each API and the rank of each said API;

finding, by the processor, a minimum number of computing devices required to schedule the plurality of APIs to adhere to the cumulative SLA, wherein finding the minimum number of computing devices comprises:

using a mixed integer programming (MIP) model for allocating the plurality of APIs in the queue;

providing an iterative increment to check whether a current set of computing devices manages to meet the cumulative SLA;

assigning the plurality of APIs to the minimum number of computing devices based on an allocation determined by the MIP model, the assigning being by creating bins of the plurality of APIs on the minimum number of computing devices; and executing the plurality of APIs on the minimum number of computing devices according to the allocation.

9. The method as claimed in claim 8, wherein the method further comprises assigning, by the processor, one or more APIs to be executed on the one or more computing devices from available set of computing devices based on the queued plurality of APIs.

10. The method as claimed in claim 9, wherein the set of parameters includes any or a combination of processing engines, memory and graphical processing units (GPU) utilization of the plurality of APIs in the queue, the available set of computing devices in the queue and constraint parameters comprising the cumulative SLA of each said API in the queue.

11. The method as claimed in claim 9, wherein the set of instructions provides optimization of scheduling of the plurality of APIs.

12. The method as claimed in claim 11, wherein the set of instructions further provides at least two simultaneous outputs comprising the number of computing devices required for running the plurality of APIs and allocation of the APIs to the computing devices.

13. The method as claimed in claim 8, wherein the method further comprises clubbing the plurality of APIs in a bin and the one or more computing devices to which the bin should be assigned.

* * * * *